United States Patent
Garg et al.

(10) Patent No.: US 12,112,202 B2
(45) Date of Patent: Oct. 8, 2024

(54) FRAMEWORK FOR APPLICATION DRIVEN EXPLORATION AND OPTIMIZATION OF HARDWARE ENGINES

(71) Applicant: Synopsys, Inc., Sunnyvale, CA (US)

(72) Inventors: Amit Garg, Noida (IN); Amit Tara, Noida (IN); Shripad Deshpande, Noida (IN)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 16/882,640

(22) Filed: May 25, 2020

(65) Prior Publication Data
US 2020/0371843 A1    Nov. 26, 2020

(30) Foreign Application Priority Data
May 25, 2019   (IN) .............................. 201911020773

(51) Int. Cl.
*G06F 9/50*   (2006.01)
*G06F 9/455*  (2018.01)
*G06F 9/48*   (2006.01)

(52) U.S. Cl.
CPC ............ *G06F 9/5027* (2013.01); *G06F 9/455* (2013.01); *G06F 9/45533* (2013.01); *G06F 9/45558* (2013.01); *G06F 9/48* (2013.01); *G06F 9/4806* (2013.01); *G06F 9/4843* (2013.01);
(Continued)

(58) Field of Classification Search
CPC .. G06F 9/455; G06F 9/45533; G06F 9/45558; G06F 9/48; G06F 9/4806; G06F 9/4843; G06F 9/4881; G06F 9/50; G06F 9/5005; G06F 9/5027; G06F 9/5061; G06F 9/5066
See application file for complete search history.

(56) References Cited

U.S. PATENT DOCUMENTS 9,836,354 B1 * 12/2017 Potlapally ........... G06F 11/1484
9,990,212 B2 *  6/2018 Kruglick ............... G06F 11/277
(Continued)

OTHER PUBLICATIONS

Teich, "Hardware/Software Codesign: The Past, the Present, and Predicting the Future," IEEE, vol. 100, pp. 1411-1430, (May 13, 2012).
(Continued)

*Primary Examiner* — Charles M Swift
(74) *Attorney, Agent, or Firm* — Weaver Austin Villeneuve & Sampson LLP

(57) ABSTRACT

A system and method for evaluating optimization of a hardware engine are described herein. In an example embodiment, a first operation of a desired application is performed using one or more hardware resources each associated with one or more task graphs of a plurality of task graphs. A first result is recorded from a first simulation based on a first task graph of the plurality of task graphs implemented using a first configuration of a first hardware resource associated with the first task graph. A second result is recorded from a second simulation based on a second task graph of the plurality of task graphs implemented using a second configuration of a second hardware resource associated with the second task graph. An interface is generated based on the first result and the second result for rendering by a display device.

19 Claims, 16 Drawing Sheets

(52) U.S. Cl.
CPC .............. *G06F 9/4881* (2013.01); *G06F 9/50* (2013.01); *G06F 9/5061* (2013.01); *G06F 9/5066* (2013.01)

(56) References Cited

U.S. PATENT DOCUMENTS

| | | | | |
|---|---|---|---|---|
| 2005/0138485 | A1* | 6/2005 | Osecky | G06F 11/1633 714/48 |
| 2007/0143762 | A1* | 6/2007 | Arnold | G06F 9/5044 718/103 |
| 2010/0199267 | A1* | 8/2010 | Rolia | G06Q 10/06 717/135 |
| 2017/0228676 | A1* | 8/2017 | Cherkasova | G06F 9/44505 |
| 2018/0150325 | A1* | 5/2018 | Kuo | G06F 9/5005 |
| 2019/0026150 | A1* | 1/2019 | Shimamura | G06F 9/5066 |
| 2019/0213029 | A1* | 7/2019 | Liu | G06F 9/45558 |
| 2019/0286478 | A1* | 9/2019 | Sengupta | G06F 9/505 |
| 2020/0050490 | A1* | 2/2020 | Schardt | G06F 9/5077 |
| 2020/0057675 | A1* | 2/2020 | Dias | G06F 9/5083 |
| 2020/0301815 | A1* | 9/2020 | Mola | G06F 11/3636 |

OTHER PUBLICATIONS

Ha, et al., "Introduction to Hardware/Software Codesign," Springer Science+Business Media Dordrecht, (eds.) Handbook of Hardware/Software Codesign, doi 10.1007/978-94-017-7358-4_41-1, (2017).
Stringham, "1. Basic of hardware/firmware interface codesign," excerpted from Hardware/Firmware Interface Design by Gary Stringham, (Jul. 7, 2013).
Vista Architect Datasheet, "System Level Design Solution for Performance and Power," Electronic System Level Design, Mentor Graphics Corporation, www.mentor.com/vista, (2009).

* cited by examiner

FRAMEWORK FOR APPLICATION DRIVEN EXPLORATION AND OPTIMIZATION OF HARDWARE ENGINES

CROSS REFERENCE TO RELATED APPLICATIONS

This application claims priority to Indian Provisional Patent Application Serial No. 201911020773, titled "FRAMEWORK FOR APPLICATION DRIVEN EXPLORATION AND OPTIMIZATION OF HARDWARE ENGINES," filed May 25, 2019, the contents of which are incorporated herein by reference in their entirety.

TECHNICAL FIELD

The present disclosure generally relates to a hardware acceleration system, and more particularly, to a framework for application driven exploration and optimization of a hardware acceleration engine.

BACKGROUND

With gaining popularity of the performance of multicore architectures, software applications continue to increase in complexity, demanding increasingly enhanced performance out of a hardware system. Several challenges arise while optimizing execution of software applications when there are multiple optimization options to choose from.

Firmware refers to a class of computer software that provides low-level control for a device's specific hardware. Firmware can either provide a standardized operating environment for more complex device software (allowing more hardware-independence), or, for less complex devices, act as the device's complete operating system, performing all control, monitoring and data manipulation functions. Examples of devices containing firmware are embedded systems, consumer appliances, computers, computer peripherals, and others. Almost all electronic devices contain some firmware.

Firmware may be held in non-volatile memory devices such as read only memory (ROM), erasable programmable read only memory (EPROM), and flash memory. Changing the firmware of a device may be performed after manufacture. Reasons for updating firmware include fixing bugs or adding features to the device. This requires ROM integrated circuits to be physically replaced, or EPROM or flash memory to be reprogrammed through a special procedure. Firmware such as the program of an embedded system may be the only program that will run on the system and provide all of its functions.

Hardware acceleration is the use of computer hardware specially made to perform some functions more efficiently than is possible in software running on a general-purpose central processing unit (CPU). Any transformation of data or routine that can be computed, can be calculated purely in software running on a generic CPU, purely in custom-made hardware, or in some mix of both. An operation can be computed faster in application-specific hardware designed or programmed to compute the operation than specified in software and performed on a general-purpose computer.

Advantages of using software include more rapid development (leading to faster time to market), lower non-recurring engineering costs, heightened portability, and ease of updating features or patching bugs, at the cost of overhead to compute general operations. Advantages of using hardware include speedup, reduced power consumption, lower latency, increased parallelism and bandwidth, and better utilization of area and functional components available on an integrated circuit; at the cost of lower ability to update designs once etched onto silicon and higher costs of functional verification and times to market. In the hierarchy of digital computing systems ranging from general-purpose processors to fully customized hardware, there is a tradeoff between flexibility and efficiency, with efficiency increasing by orders of magnitude when any given application is implemented higher up that hierarchy. This hierarchy includes general-purpose processors such as CPUs, more specialized processors such as graphics processing units (GPUs), fixed-function implemented on field-programmable gate arrays (FPGAs), and fixed-function implemented on application-specific integrated circuit (ASICs).

Hardware acceleration is advantageous for performance, and practical when the functions are fixed so updates are not as needed as in software solutions. With the advent of reprogrammable logic devices such as FPGAs, the restriction of hardware acceleration to fully fixed algorithms has eased, allowing hardware acceleration to be applied to problem domains requiring modification to algorithms and processing control flow.

Accordingly, to accelerate execution of a given software application, (1) the software code itself may be optimized, and/or (2) a dedicated hardware accelerator (or dedicated firmware) may be employed for all or part of the given software application.

With respect to optimizing the software code itself, the operations performed by the software can be optimized by having efficient embedded firmware using various optimization techniques to manage hardware. With respect to employing a dedicated accelerator, optimizing the actual software provides limited speed-up and is only possible in the later stages of system development (e.g., after hardware and software have been finalized).

Designing hardware engines (also referred to herein as hardware accelerators) for given applications is a cumbersome and restrictive approach as it relies on analysis of a current state of a software application and then mapping it to a specific hardware engine. This usually results in design of the hardware engine for a subset of applications and/or implementations of a given application. Also, it is very difficult to assess the performance of the hardware engine either for a new application or for a new implementation of the application.

SUMMARY

Embodiments of systems, devices, and methods relate to application driven exploration and optimization of hardware acceleration engines. In an example embodiment, a first operation of a desired application is performed using one or more hardware resources each associated with one or more task graphs of multiple task graphs. A first result from a first simulation is recorded where the first simulation is based on a first task graph of the multiple task graphs implemented using a first configuration of a first hardware resource associated with the first task graph. A second result from a second simulation is recorded where the second simulation is based on a second task graph of the multiple task graphs implemented using a second configuration of a second hardware resource associated with the second task graph. An interface is generated for rendering by a display device, where the interface generated based in part on the first result and the second result.

In some embodiments, the first task graph includes a first input interface and a first output interface and the second task graph includes a second input interface and a second output interface. In some embodiments, the first input interface matches the second input interface and the first output interface matches the second output interface. In some embodiments, the first task graph and the second task graph represent a common programmatic functionality.

In some embodiments, the one or more hardware resources are encapsulated into a hardware engine. A hardware engine input interface and a hardware engine output interface are generated for the hardware engine. One or more operations associated with the desired application are mapped to the hardware engine.

In some embodiments, a hardware resource configuration includes multiple configurable attributes. Configurable attributes may be core type, firmware designation, general purpose, special purpose, packet size, packet descriptor size, processing speed, operations-per-cycle, pipeline-depth, branch predictor, stochastic cache, or tightly coupled memory (TCM). In some embodiments, a hardware resource includes a processing element and a memory driver. A hardware resource may further include one or more hardware resource interfaces.

In some embodiments, the interface for rendering by a display device includes digital representations of one or more of utilization data, resource utilization data, performance data, cost data, area data, timing data, resource analysis trace data, execution sequence trace data, or resource instance trace data.

In some embodiments, one or more embedded tasks of the first task graph or second task graph or the one or more operations associated with the desired application are received via interaction signals. Hardware resource configurations may be received via interaction signals prior to the first simulation or the second simulation.

In some embodiments, selection of a hardware resource configuration based on data displayed via the interface is enabled. Altering of hardware resource configurations based on data displayed via the interface is enabled.

In some embodiments, the first simulation and the second simulation are performed substantially simultaneously.

In some embodiments, a third result from a third simulation is recorded where the third simulation is based on the first task graph of the multiple task graphs implemented using a third configuration of the first hardware resource associated with the first task graph. An interface for rendering by a display device, where the interface is generated based in part on the first result and the third result.

In an example embodiment, a first operation of a desired application is performed using one or more hardware resources each associated with one or more task graphs of multiple task graphs. A first result from a first simulation is recorded where the first simulation is based on a first task graph of the multiple task graphs implemented using a first configuration of a first hardware resource associated with the first task graph. A second result from a second simulation is recorded where the second simulation is based on the first task graph of the multiple task graphs implemented using a second configuration of the first hardware resource associated with the first task graph. An interface for rendering by a display device is generated where the interface is generated based in part on the first result and the second result.

In some embodiments, a third result from a third simulation is recorded where the third simulation is based on a second task graph of the multiple task graphs implemented using a third configuration of a second hardware resource associated with the second task graph. An interface for rendering by a display device is generated where the interface is generated based in part on the first result and the third result.

In some embodiments, the first configuration represents a hardware accelerator and the second configuration represents firmware. In embodiments, the first configuration or the second configuration comprises one or more of a general purpose CPU, a GPU, a DSP, a hardware accelerator, or firmware.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein and be protected by the accompanying claims. In no way should the features of the example embodiments be construed as limiting the appended claims, absent express recitation of those features in the claims.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
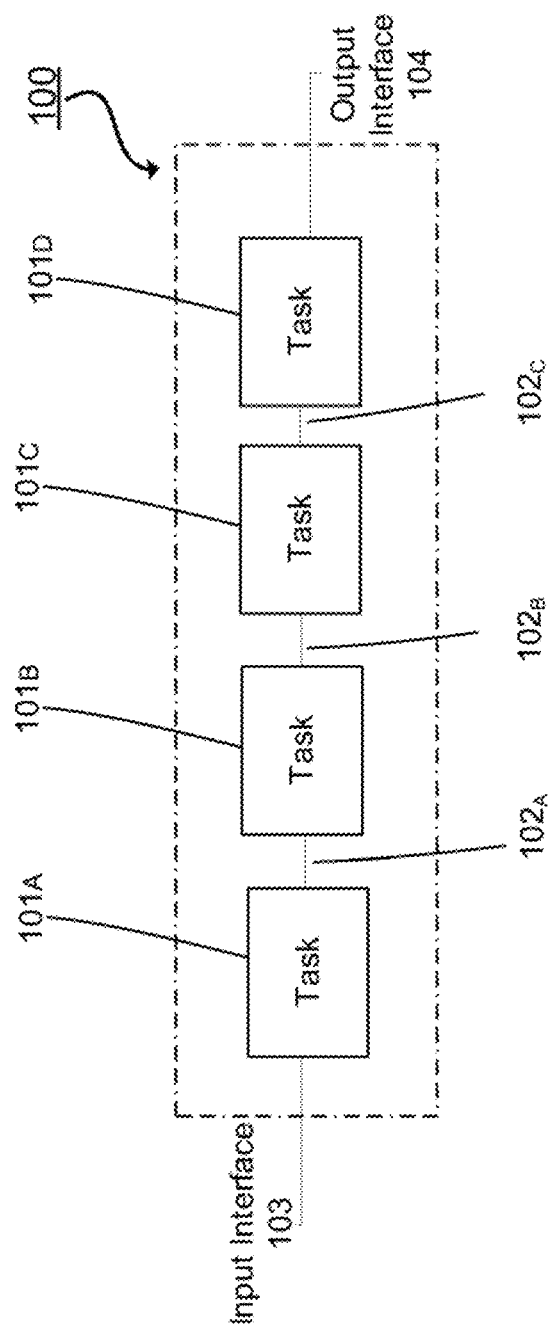
FIG. 1 illustrates an example task graph for use with embodiments of the present disclosure.

Aspects of the present disclosure relate to application driven exploration and optimization of hardware acceleration engines. A need exists for a framework which provides for application driven exploration of optimization of hardware acceleration engines.

Embodiments of the present disclosure enable optimization of an application with respect to hardware early in the design cycle, as opposed to conventional solutions to such optimizations. Embodiments of the present disclosure enable efficient programmatic evaluation of tradeoffs associated with implementing part of all of a given application using hardware acceleration or firmware. That is, software applications include instructions that are to be executed using hardware, and optimization of the software application includes decisions regarding selecting which hardware may execute any given set of instructions of the software application. Understanding which tasks (e.g., including a set of instructions) are best suited to execution using a general purpose CPU, a hardware accelerator, dedicated firmware, or other configuration of a hardware resource is conventionally a computationally and time intensive exercise that requires multiple iterations and separate experiments and measurements associated with each permutation of selected hardware options. Embodiments of the present disclosure reduce such complexity.

Embodiments of the present disclosure enable software design space exploration such that minimum latency and maximum throughput may be achieved while designing a hardware engine. Interfaces associated with embodiments of the present disclosure enable rendering of performance analysis metrics and data visualization via electronic interfaces.

Early exploration of performance and cost associated with different programmatic functionalities at system level is a non-trivial task. In many cases, the programmatic functionality (e.g., firmware or hardware acceleration candidate) is developed independent of the application software. Hence a clear design decision may not be made before actual hardware and software are available. Embodiments of the present disclosure enable creation of abstract hardware and software models, along with an abstract programmatic functionality. This provides several data points for deciding overall system design along with several optimum configurations.

Not only do embodiments of the present disclosure enable such evaluations early in the software design process (e.g., well before software is finalized), the present disclosure eliminates the need for serial evaluations for countless embedded tasks within the same software application. That is, for example, existing solutions require that a solution involving a hardware accelerator be evaluated on its own, in the absence of comparison data regarding a solution involving firmware or simply optimized software. Moreover, a software application includes countless tasks that may be candidates for one or more of hardware acceleration, dedicated firmware, other configuration of a hardware resource, or software optimization. The simultaneous and dynamic evaluation of such design options reduces design time, computing time, and the use of computing resources dedicated to existing serial evaluations.

By way of example, traditionally Ethernet packet transmission is implemented mostly in software and executed on a general purpose processor (e.g., a CPU or GPU). With the demand of higher bandwidth networks in high performance computing systems, Ethernet packet transmission has become a major bottleneck in data transfer as the processor spends most of its time in handling incoming/outgoing packets rather than running other pieces of the software. One solution is to offload this work to a dedicated hardware accelerator, however an understanding of performance tradeoffs between offloading the work to a dedicated hardware accelerator or by using firmware is not readily obtained.

A task graph refers to a data structure for representing a programmatic functionality made up of multiple tasks (or embedded tasks). That is, a programmatic functionality may achieve a desired function by way of a series of computational tasks, and may be represented as a task graph. A task graph includes nodes and edges, where the nodes represent computational tasks and edges model precedence constraints (e.g., dependencies) between tasks.

FIG. 1 illustrates an example task graph for use with embodiments of the present disclosure. In FIG. 1, a programmatic functionality may include a plurality of tasks (e.g., embedded tasks or units of work) (e.g., $101_A$, $101_B$, $101_C$, $101_D$) and each task may have dependencies ($102_A$, $102_B$, $102_C$) associated therewith. A programmatic functionality (also referred to herein as a feature) may therefore be modeled, in embodiments disclosed herein, as a task graph 100 representing each of its tasks (e.g., $101_A$, $101_B$, $101_C$, $101_D$) and their respective dependencies ($102_A$, $102_B$, $102_C$). That is, the task graph 100 includes nodes each representing a task and each node is associated with one or more edges representing its dependencies. The task graph 100 may also include objects representing processing and memory requirements associated with the programmatic functionality or task it represents. The task graph 100 further includes definitions of one or more input interfaces 103 and an output interface 104 for the programmatic functionality or task it represents. Generation of a task graph 100 and defining input 103 and output interfaces 104 of programmatic functionality may be referred to herein as encapsulating a feature.

Figure 2A:
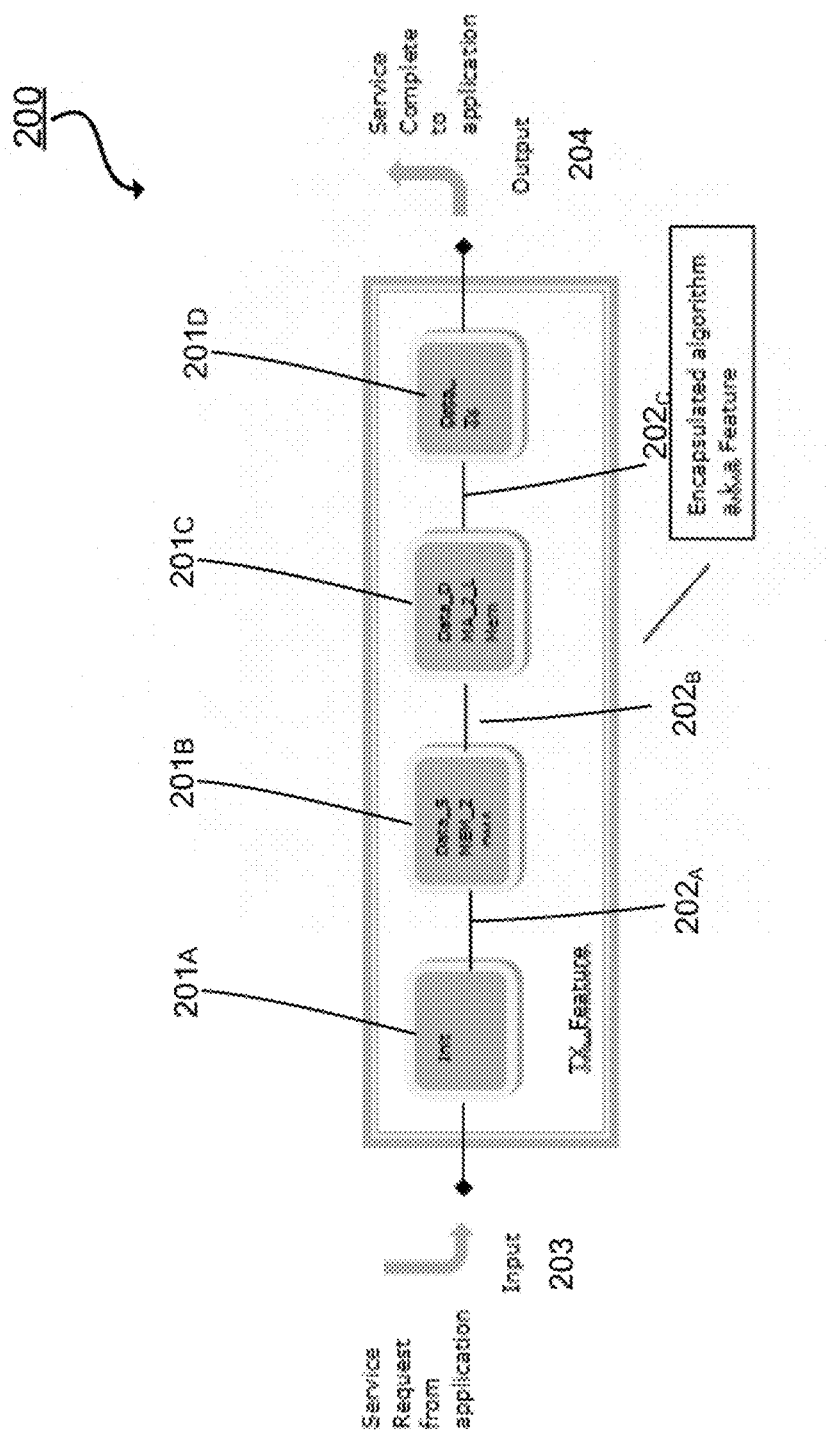
FIG. 2A illustrates an example transmission feature including a series of connected tasks, for use with embodiments of the present disclosure.

FIG. 2A illustrates an example Ethernet transmission programmatic functionality modeled as a task graph, for use with embodiments of the present disclosure. A programmatic functionality may include a plurality of tasks (e.g., embedded tasks or units of work) and each task may have dependencies associated therewith. A programmatic functionality (also referred to herein as a feature) may therefore be modeled, in embodiments disclosed herein, as a task graph 100 representing each of its tasks (e.g., $101_A$, $101_B$, $101_C$, $101_D$) and their respective dependencies ($102_A$, $102_B$, $102_C$). That is, the task graph includes nodes each representing a task and each node is associated with one or more edges representing its dependencies. The task graph may also include objects representing processing and memory requirements associated with the programmatic functionality it represents. The task graph further includes definitions of one or more input interfaces 103 and an output interface 104 for the programmatic functionality it represents. Generation of a task graph and defining input and output interfaces of an programmatic functionality may be referred to herein as encapsulating a feature.

By way of example, in FIG. 2A, an Ethernet transmission (Tx) data flow is modelled as a task graph 200 including a plurality of connected tasks $201_A$, $201_B$, $201_C$, $201_D$ (e.g., by way of dependencies therebetween $202_A$, $202_B$, $202_C$). Tasks illustrated as part of the Ethernet transmission (Tx) data flow in FIG. 2A include descriptor and data memory initialization (Init $201_A$), descriptor and data buffer fetch from system memory to DMA (Data_SMEM_2_DMA $201_B$), data write to local memory (Data_DMA_2_LMEM $201_C$), and data transmit on ethernet (Data_Tx $201_D$).

An example Ethernet Tx programmatic functionality task graph 200 includes two interfaces, input interface 203 and output interface 204. In one embodiment, an Ethernet Tx operation in an application software may issue a request service through input interface 203 and the completion of the service is indicated back to the application software through output interface 204.

Figure 2B:
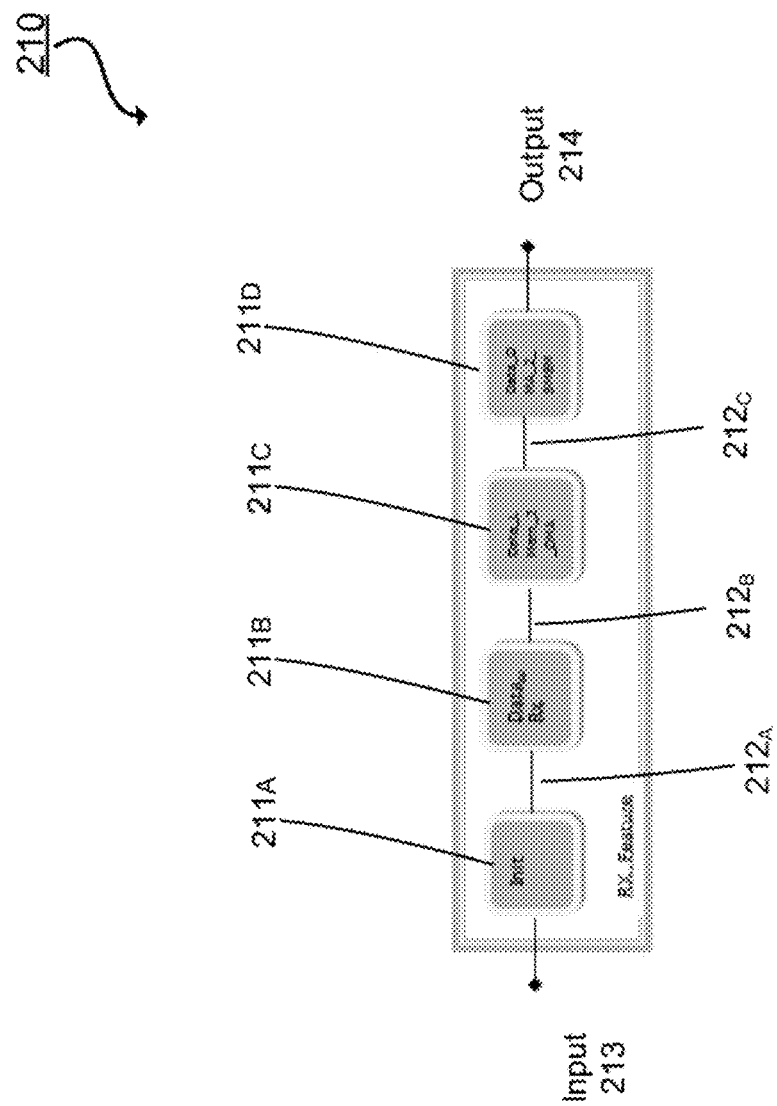
FIG. 2B illustrates an example receiver feature including a series of connected tasks, for use with embodiments of the present disclosure.

FIG. 2B illustrates an example receiver functionality modeled as a task graph, for use with embodiments of the present disclosure. Tasks illustrated as part of the Ethernet receiver (Rx) programmatic functionality task graph 210 include descriptor and data memory initialization (Init $211_A$), data received on Ethernet (Data_Rx $211_B$), data write to local memory (Data_LMEM_2 DMA $211_C$) and descriptor and data buffer send to system memory (Data_DMA_2_SMEM $211_D$).

An example Ethernet Rx programmatic functionality task graph 210 includes two interfaces, input interface 213 and output interface 214. In one embodiment, an Ethernet Rx operation in an application software may issue a request service through input interface 213 and the completion of the service is indicated back to the application software through output interface 214.

In alternative sequences, a firmware algorithm providing runtime services for the Ethernet Rx application may capture its sequence as—initialization, data read, data processing, and data write. An acceleration algorithm may capture such a sequence as—registers initialization, data read/write to local memory, data registers processing. Accordingly, it will be appreciated that embodiments of the present disclosure utilize an abstract programmatic functionality which can be retargeted to any underlying set of hardware resources (e.g., any number and type of direct memory access (DMA) engines or compute engines as well as any type of hardware resource including general purpose CPUs, DSP, GPUs for programmatic functionalities such as cyclic redundancy check (CRC) calculation and packet formatting, and the like).

Figure 3:
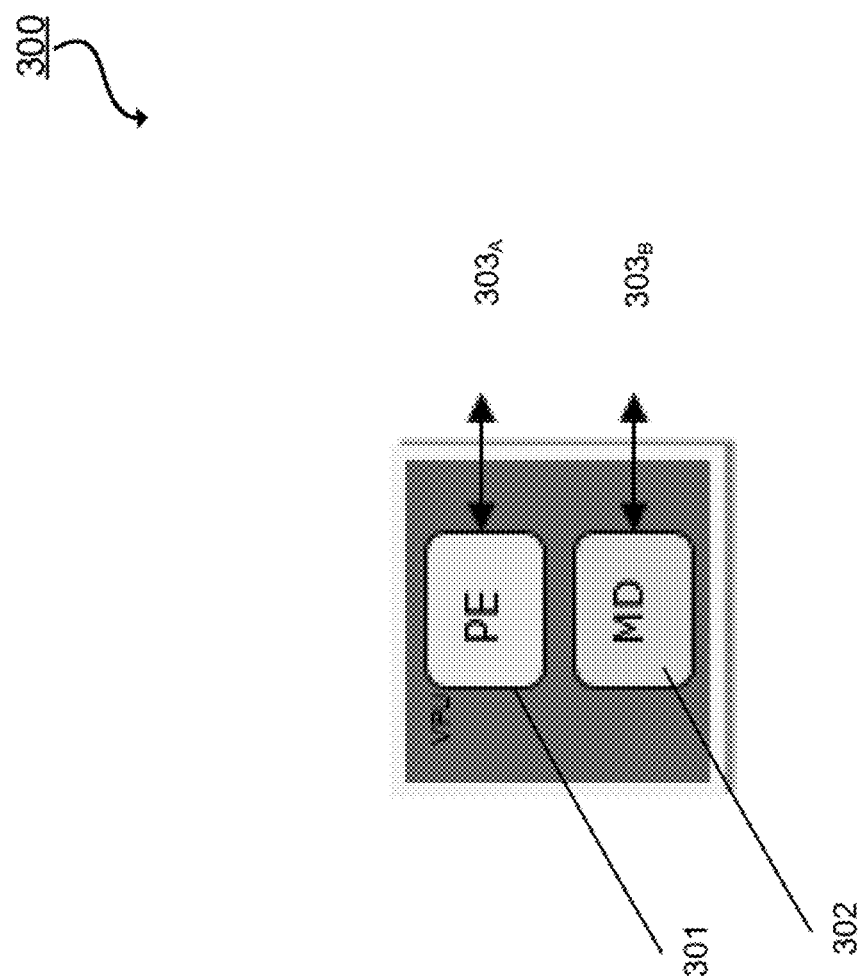
FIG. 3 illustrates an example model of a hardware resource for use with embodiments of the present disclosure.

FIG. 3 illustrates an example model of a hardware resource 300 for use with embodiments of the present disclosure. In FIG. 3, a hardware resource 300 may be modeled as a virtual processing unit (VPU) having processing resources (e.g., processing element (PE) 301) and memory resources (e.g., memory driver (MD) 302). In one embodiment, PE 301 models the computation delay in terms of processing cycles and MD 302 models the memory traffic in terms of read and write bytes. Embodiments of the present disclosure execute tasks requesting processing and memory services using hardware resources as shown in FIG. 3. The hardware resource 300 may further include interfaces 303A, 303B to send out memory transactions onto interconnects.

In embodiments, a VPU includes a set of attributes such as operations per cycle, pipeline depth, branch predictor, stochastic cache, tightly coupled memory (TCM), and the like. Such attributes are configurable to characterize a VPU to represent any type of hardware resource, such as a general purpose CPU, a GPU, a DSP, a baseband processor, and the like. Accordingly, a VPU (e.g., or hardware resource) may be associated with a particular configuration. The particular configuration includes the aforementioned set of attributes and may also include the VPU being implemented as firmware.

Figure 4:
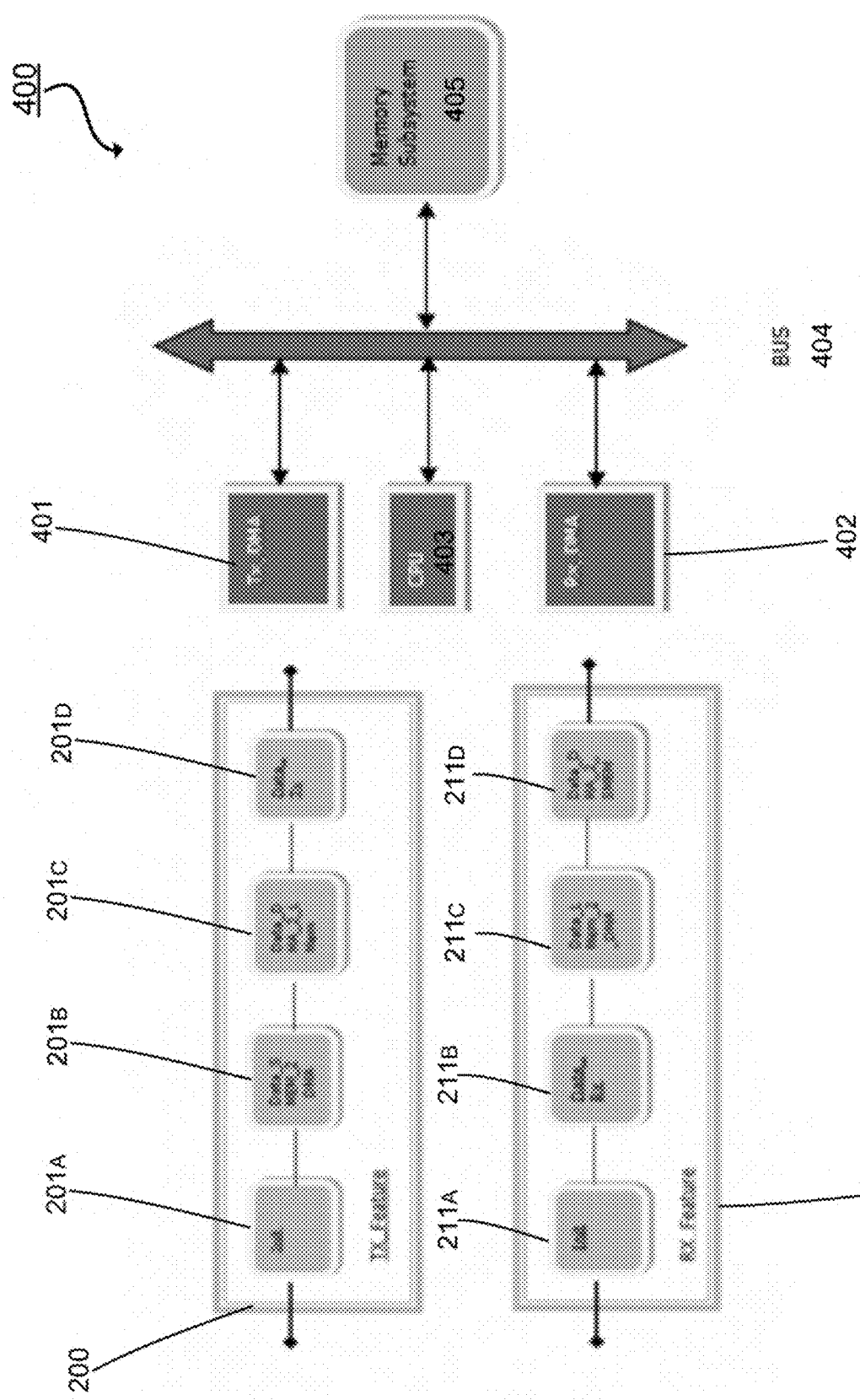
FIG. 4 illustrates an example mapping of task graphs to hardware resources of a hardware platform, for use with embodiments of the present disclosure.

FIG. 4 illustrates an example mapping 400 of task graphs to hardware resources of a hardware platform, for use with embodiments of the present disclosure. A mapping of a programmatic functionality modeled as a task graph to a hardware platform may include assigning each task unit of a task graph to a hardware resource upon which to execute. A hardware platform, an example of which is shown in FIG. 4, may include multiple DMA engines (401, 402) and a CPU 403. The DMA engines (401, 402) and CPU 403 may be modeled by VPUs (e.g., as shown in FIG. 3) and connected to a memory subsystem 405 via an interconnect (e.g., bus) 404. The hardware platform may further include a local memory (not shown) to buffer and transmit/receive data from the Ethernet interface (not shown).

For example, in FIG. 4, the Ethernet Tx/Rx features (e.g., task graphs) 200, 210, may be mapped by way of data intensive tasks (e.g., to Tx_DMA 401, Rx_DMA 402) and initialization tasks (e.g., to CPU 403). Table 1 illustrates an example mapping for FIG. 4.

TABLE 1

| Task | Resource |
|---|---|
| Hardware Resource Mapping for Tx Feature 200 | |
| Init ($201_A$) | CPU (403) |
| Data_SMEM_2_DMA ($201_B$) | Tx_DMA (401) |
| Data_DMA_2_LMEM ($201_C$) | Tx_DMA (401) |
| Data_Tx ($201_D$) | Tx_DMA (401) |
| Hardware Resource Mapping for Rx Feature 210 | |
| Init ($211_A$) | CPU (403) |
| Data_Rx ($211_B$) | Rx_DMA (402) |
| Data_LMEM_2_DMA ($211_C$) | Rx_DMA (402) |
| Data_DMA_2_SMEM ($211_D$) | Rx_DMA (402) |

Figure 5:
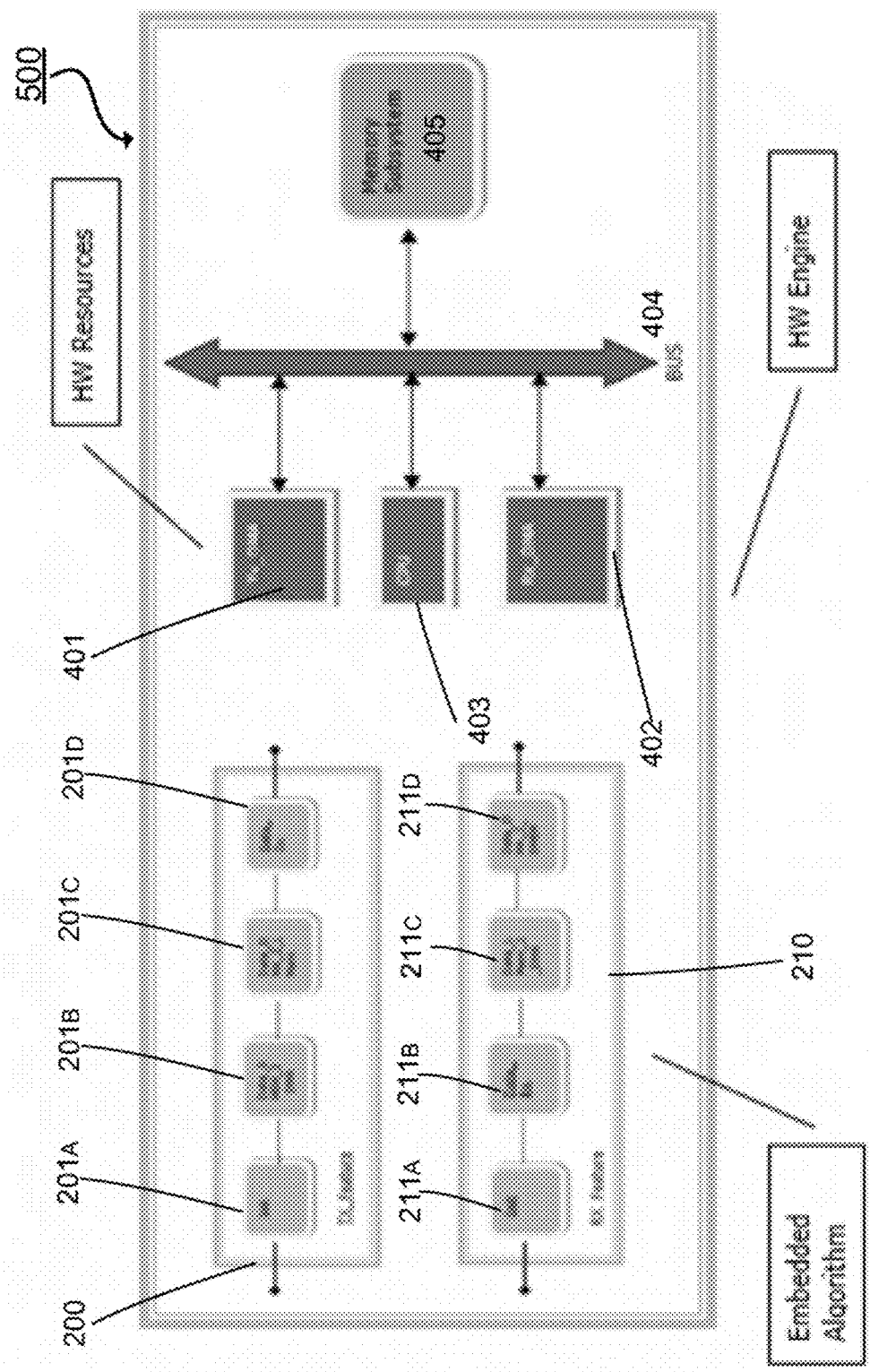
FIG. 5 illustrates an example hardware engine block that encapsulates mapped hardware resources and corresponding tasks, for use with embodiments of the present disclosure.

FIG. 5 illustrates an example hardware engine 500 that encapsulates mapped hardware resources and corresponding programmatic functionalities, for use with embodiments of the present disclosure. In one embodiment, once hardware mapping (e.g., as depicted in FIG. 4) is complete, the hardware resources (401-405) may be encapsulated along with the corresponding task graphs (200, 220) into a hierarchical hardware engine block 500 (also referred to as a hardware engine or IP). Encapsulating hardware resources and corresponding task graphs into a hardware engine includes hard wiring the hardware resources as well as generating higher level input and output interfaces for the hardware engine (e.g., as opposed to lower level hardware resource input and output interfaces) for configuring and interacting with sub-components within the hardware engine. In embodiments, the hardware engine 500 is configurable to have its own scheduling policy in case of resource contention among multiple mapped tasks. For example, the scheduler type can be configured either as co-operative or pre-emptive, while the scheduler algorithm can be configured as round-robin, priority, or any other custom scheduling algorithm.

Figure 6:
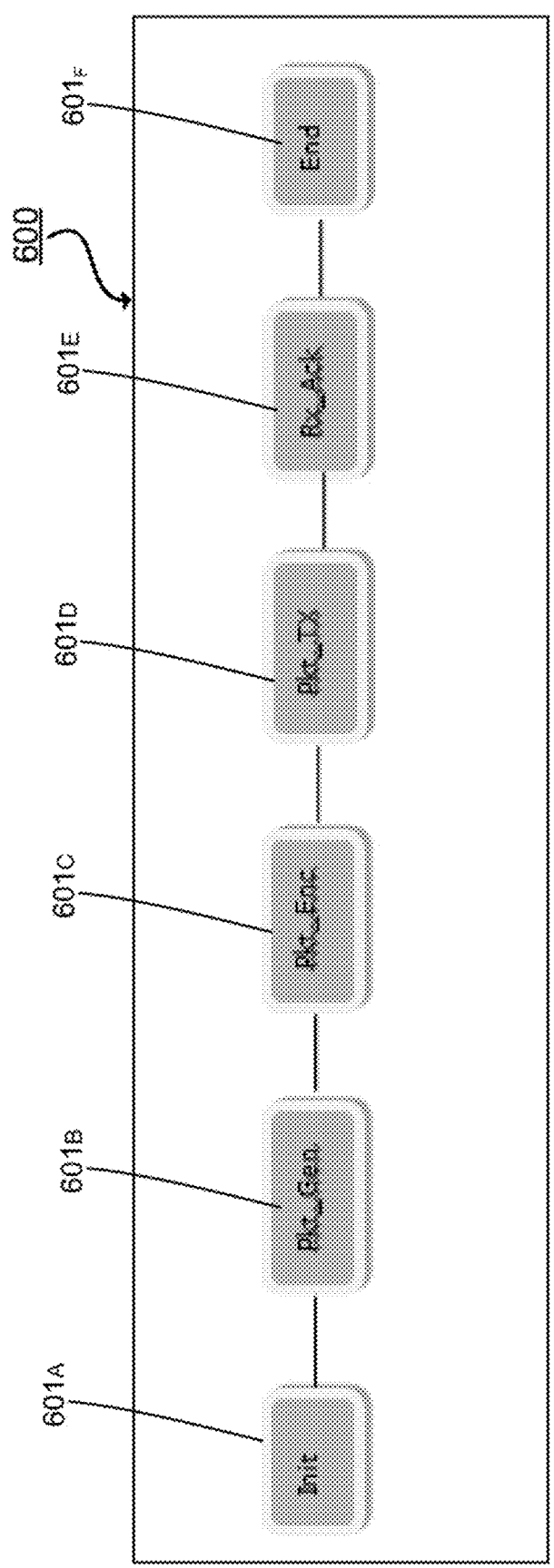
FIG. 6 illustrates an example model of application software as an application task graph, for use with embodiments of the present disclosure.

FIG. 6 illustrates an example model 600 of application software as an application task graph, for use with embodiments of the present disclosure. In embodiments, an application software can include various processes (or threads), each of which can request different runtime services. The application software can be modeled (e.g., 600) as series of application tasks (e.g., $601_A$, $601_B$, $601_C$, $601_D$, $601_E$, $601_F$) to be performed using a hardware engine to which it may be mapped. For example, an application task graph 600 representing an Ethernet application starts with initialization (e.g., $601_A$), packet generation (e.g., $602_B$), packet encoding (e.g., $601_C$), packet transmission (e.g., $601_D$), receiving acknowledgement (e.g., $601_E$), and terminates (e.g., $601_F$).

Figure 7:
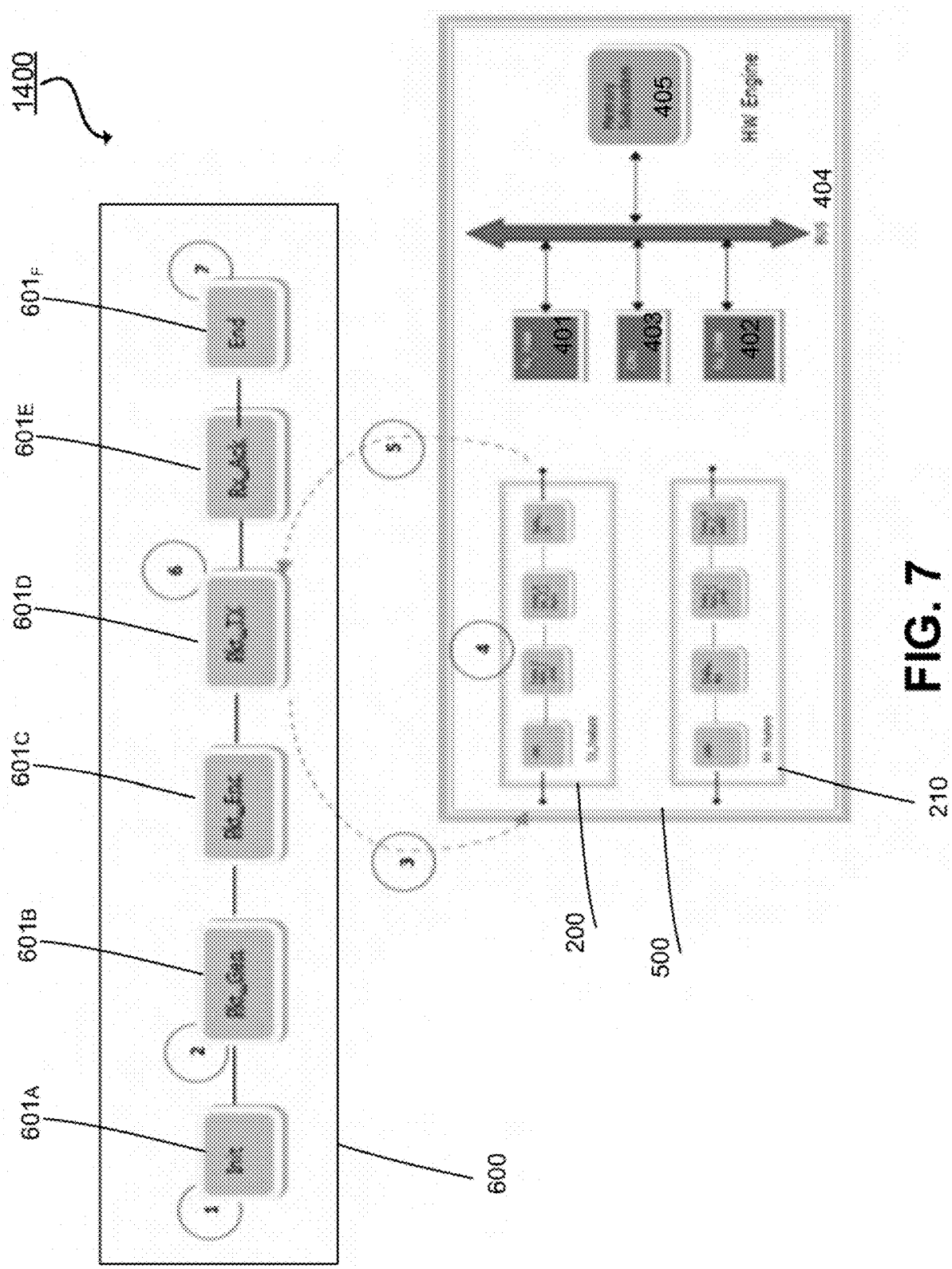
FIG. 7 illustrates an example mapping of an application software task to a mapped hardware resource, for use with embodiments of the present disclosure.

FIG. 7 illustrates an example mapping 1400 of an application software task to a mapped hardware resource, for use with embodiments of the present disclosure. In embodiments, an application task graph (e.g., 600) can execute on hardware engine (e.g., 500). A hardware engine (e.g., 500) publishes its programmatic functionalities (e.g., represented as task graph 200 or 210) as an interface, to serve any request from the application task graph (e.g., 600). A programmatic functionality (e.g., represented as task graph 200 or 210) can serve the requests and manage the hardware execution per its associated hardware mapping, as described above with respect to FIG. 4 and Table 1.

In embodiments, a programmatic functionality (e.g., represented by task graph 200, 210) may be activated by an application task graph (e.g., 600) to perform any meaningful operation. A task unit (e.g., $601_A$, $601_B$, $601_C$, $601_D$, $601_E$, $601_F$) in the application task graph (e.g., 600) can issue a request for an operation which can be served by the hardware engine (e.g., 500). This operation is modeled as a task graph (e.g., 200, 210) in the hardware engine (e.g., 500), as described herein.

In embodiments, the hardware engine (or IP) (e.g., 500) defines the programmatic functionality (e.g., 200, 210) as an interface to the application task graph (e.g., 600). The application task graph (e.g., 600) is mapped in order to affiliate with this interface for execution. Accordingly, each task (e.g., $601_A$, $601_B$, $601_C$, $601_D$, $601_E$, $601_F$) in an application task graph (e.g., 600) may be mapped to a hardware engine interface (not shown). An example of this is shown in Table 2.

TABLE 2

| Workload Mapping | |
|---|---|
| Task | Resource |
| Pkt_Tx (e.g., $601_D$) | Tx_Feature (e.g., 200) |

Referring to FIG. 7, an example sequence of an application execution includes: (1) an Init task (e.g., $601_A$) constituting an initialization delay in the system; (2) once the system is initialized, it generates (e.g., $601_B$) and encodes a packet (e.g., $601_C$); (3) once the packet(s) are encoded, the packet transmission (e.g., $601_D$) requests the hardware engine (e.g., 500) for its services according to a workload mapping, where it has been mapped to TX_Feature (e.g., 100) of the hardware engine (e.g., 500); (4) the packet TX_Feature (e.g., 200) gets activated and executes based on its attributes and hardware mapping, as described herein; (5) once complete, TX_Feature (e.g., 200) indicates such back to the packet transmission operation (Pkt_Tx) (e.g., $601_D$); (6) upon receiving the completion indication, Pkt_Tx further activates the end task (e.g., $601_F$) for termination (e.g., after acknowledgement (e.g., $601_E$)).

Figure 8:
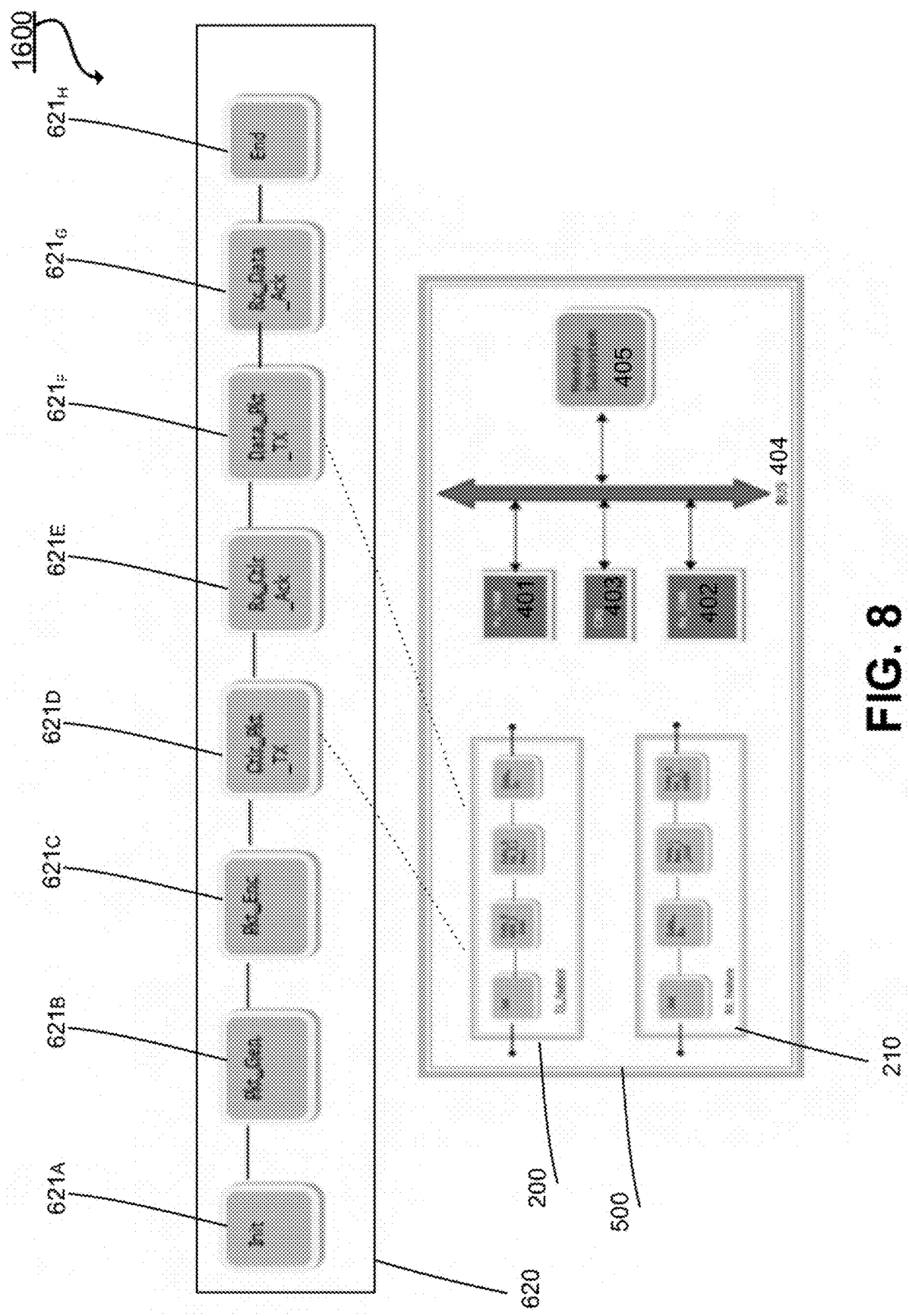
FIG. 8 illustrates an example mapping of application software tasks to a plurality of mapped hardware resources, for use with embodiments of the present disclosure.

FIG. 8 illustrates an example mapping 1600 of application software tasks to a plurality of mapped hardware resources, for use with embodiments of the present disclosure. In embodiments, each application task of an application task graph can be mapped to an interface (e.g., an input/output interface of a task graph or hardware resource) of a hardware engine, and a hardware engine can include multiple task graphs or hardware resources providing different services. Each application node/task in an application task graph or model can be mapped individually to the different task graph or hardware resource.

For example, in FIG. 8, the hardware engine (e.g., 500) contains each type of TX and RX embedded-algorithm (TX_Feature 200 and RX_Feature 220), for Ethernet packet handling. An application can have different transmission requirements at different points in time, based on its architecture. The application may start with a low transmission rate for control packets (e.g., Ctlr_Pkt_TX) to complete the handshake between sender and receiver, and may shift to a high transmission rate for data transfer (e.g., Data_Pkt_TX) thereafter.

Accordingly, shown as an example in FIG. 8, the application task graph (e.g., 620) differs slightly from that shown in FIG. 7 (e.g., 600) in that the packet transmission and acknowledgment is divided into two phases. That is, application task graph 620 representing an Ethernet application starts with initialization (e.g., Init $621_A$), packet generation (e.g., Pkt_Gen $622_B$), packet encoding (e.g., Pkt_Enc $621_C$), control packet transmission (e.g., Ctlr_Pkt_TX $621_D$), control packet receiving acknowledgement (e.g., Rx_Ctlr_Ack $621_E$), data packet transmission (e.g., Data_Pkt_TX $621_F$), data packet receiving acknowledgement (e.g., Rx_Data_Ack $621_G$), and terminates (e.g., $621_H$).

The tasks (e.g., $621_A$, $621_B$, $621_C$, $621_D$, $621_E$, $621_F$, $621_G$, $621_H$) in the application task graph 620 can be mapped individually to any of the programmatic functionalities (e.g., represented as task graphs 200, 220), as shown in Table 3. Accordingly, it will be appreciated that a programmatic functionality may be a templated model, which may have no effect on the system unless tasks in an application task graph activate it. The programmatic functionality can be configured as a unique set of embedded tasks with each mapping of an application task to it, which means that each application task can make different types (processing or memory intensive) of service requests to the same programmatic functionality.

In the example workload mapping shown in FIG. 8, both the TX operations, Ctlr_Pkt_TX (e.g., $621_D$) and Data_Pkt_TX (e.g., $621_F$) request/are mapped to the same service/programmatic functionality, TX_Feature (e.g., 200), from the hardware engine 500. However, the processing and memory load may be configured differently for each mapping. Therefore, a programmatic functionality incurs the processing or memory load on the system in context of the mapped application task.

TABLE 3

Workload Mapping

| Task | Interface | Programmatic Functionality Configuration |
|---|---|---|
| Ctlr_Pkt_TX (e.g., $621_D$) | TX_Feature (e.g., 200) | cyles = 1<br>desc_size = 8 B<br>data_size = 5 kB<br>num_beats = 1 |
| Ctlr_Ack_RX (e.g., $621_E$) | RX_Feature (e.g., 210) | cyles = 1<br>desc_size = 8 B<br>data_size = 0 B<br>num_beats = 1 |
| Data_Pkt_TX (e.g., $621_F$) | TX_Feature (e.g., 200) | cyles = 10<br>desc_size = 16 B<br>data_size = 1 MB<br>num_beats = 128 |
| Data_Ack_RX (e.g., $621_G$) | RX_Feature (e.g., 210) | cyles = 2<br>desc_size = 8 B<br>data_size = 0 B<br>num_beats = 1 |

Referring to Table 3, the control packet transmission (Ctlr_Pkt_TX (e.g., $621_D$)) is less intensive with packet descriptor size (desc_size) and data to transmit (data_size), as these transmissions are only for handshake between sender and receiver, while the data packet transmission (Data_Pkt_TX (e.g., $621_F$)) is more intensive with desc_size and data_size of packets as these transmissions are for actual data transmission. Similarly, receiving acknowledgements is less intensive with respect to reception attributes.

Figure 9:
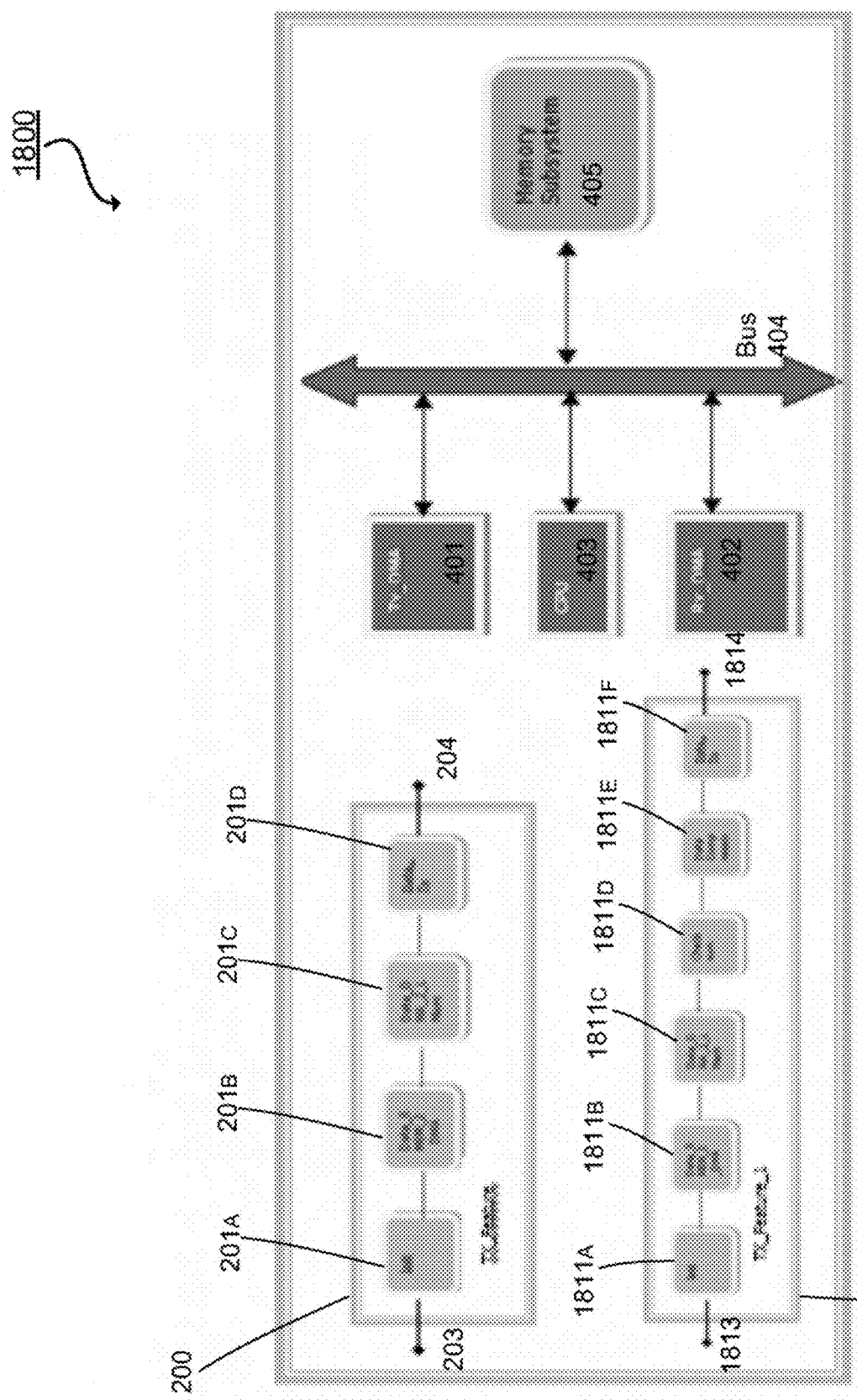
FIG. 9 illustrates an example mapping of application software tasks to a plurality of mapped hardware resources, for use with embodiments of the present disclosure

FIG. 9 illustrates an example mapping of application software tasks to a plurality of mapped hardware resources, for use with embodiments of the present disclosure. As described above, embodiments of the present disclosure enable exploration of design options with respect to desired programmatic functionalities.

A hardware engine (or IP) can contain multiple task graphs representing programmatic functionalities, providing services to the same types of requests, but that differ algorithmically. An application task can be mapped to any one of the multiple task graphs and embodiments described herein enable performance evaluations across different programmatic functionality implementations. Exploration among all available task graphs representing programmatic functionalities is provided such that a user is enabled to choose which option provides optimal performance in context of the application in question.

For example, shown in FIG. 9, a hardware engine 1800 may include two variants of task graphs for Ethernet packet transmission functionality (e.g., 200, 1810). That is, the task graphs may serve the same functionality but differ in terms of architecture and topology. To study the trade-off as to which task graph (and corresponding programmatic functionality implementation) is best suited for a specific application, embodiments herein provide a mechanism to execute both of the different task graphs in the context of the given application and compare the results.

In the example shown in FIG. 9, TX_Feature (e.g., 200) may be a simple transmission task graph including descriptor and data memory initialization (Init $201_A$), descriptor and data buffer fetch from system memory to DMA (Data_SMEM_2_DMA $201_B$), data write to local memory (Data_DMA_2_LMEM $201_C$), and data transmit on ethernet (Data_Tx $201_D$). TX_Feature (e.g., 200) may further include two interfaces, input interface 203 and output interface 204. A different variant of Ethernet transmission, TX_Feature_1 (e.g., 1810) may include a checksum (e.g., $1811_D$) and data compression (e.g., $1811_E$) in addition to descriptor and data memory initialization (Init $1811_A$), descriptor and data buffer fetch from system memory to DMA (Data_SMEM_2_DMA $1811_B$), data write to local memory (Data_DMA_2_LMEM $1811_C$), and data transmit on ethernet (Data_Tx $1811_F$). TX_Feature_1 (e.g., 1810) may further include two interfaces, input interface 1813 and output interface 1814. It will be appreciated that a request served to input interface 203 for task graph 200 may include the exact same parameters as a request served to input interface 1813 of task graph 1810. It will further be appreciated that an output received from output interface 204 may include the exact same parameters as an output received from output interface 1814.

Moreover, in embodiments, a programmatic functionality can be realized either as a firmware or an acceleration algorithm for a hardware accelerator. If the programmatic functionality, along with the hardware resources is realized in actual physical hardware then it becomes a hardware accelerator. On the other hand, if the programmatic functionality is realized as software logic then it becomes a firmware. By way of example, the Ethernet packet transmission can be executed on specialized hardware which can accelerate the execution of algorithm and vast improvement in transmission bandwidth can be achieved.

In embodiments herein, the difference between realizing a programmatic functionality as firmware, a hardware accelerator, or other variant of a processing unit may be associated with scaling the load which it puts on the system. Since a hardware accelerator has an advantage of intrinsic speed, the programmatic functionality, when realized as an accelerator, may possibly execute faster than if the functionality were realized as firmware.

For example, an operation implemented by a programmatic functionality may take 10 cycles to complete when realized as firmware and 5 cycles when realized as a hardware accelerator. This can be achieved by mapping the programmatic functionality to a VPU which is configured as desired (explained above). Examples include:

A general purpose CPU, which may be represented by a VPU capable of performing 1 operation in each cycle, i.e. operations-per-cycle=1. While executing, this VPU will not scale down the load of the programmatic functionality. Therefore, if the programmatic functionality has 100 operations, it shall take 100/1 cycles to execute.

A specialized CPU, which may be represented by a VPU capable of performing n operations per cycle, i.e. operations-per-cycle=n. While executing, this VPU will scale down the load of the programmatic functionality by a factor of n. Therefore, if a task has 100 operations, it shall take 100/n cycles to execute.

However, factoring in cost, not all logic is ideally realized with hardware acceleration. Accordingly, embodiments herein enable exploration of the trade-offs between the implementation of programmatic functionality as a firmware, an accelerator, or combination of both by offloading only certain pieces into dedicated accelerator.

Embodiments herein enable a programmatic functionality to be easily retargeted to any core type, general purpose, or accelerator, without any overhead of porting the programmatic functionality from one target platform to the other by virtue of the hardware resource mapping described herein.

Once hardware mapping is finalized, the implementation of programmatic functionality can further be optimized. These optimizations may consider the slowdown due to several reasons, including:

Dependencies in the programmatic functionality model causing bottlenecks during its execution;

A slower task is choking the system, resulting in backpressure of the programmatic functionality and hence the application;

Some of the tasks in programmatic functionality model are not getting resources due to suboptimal resource allocation.

Figure 10A:
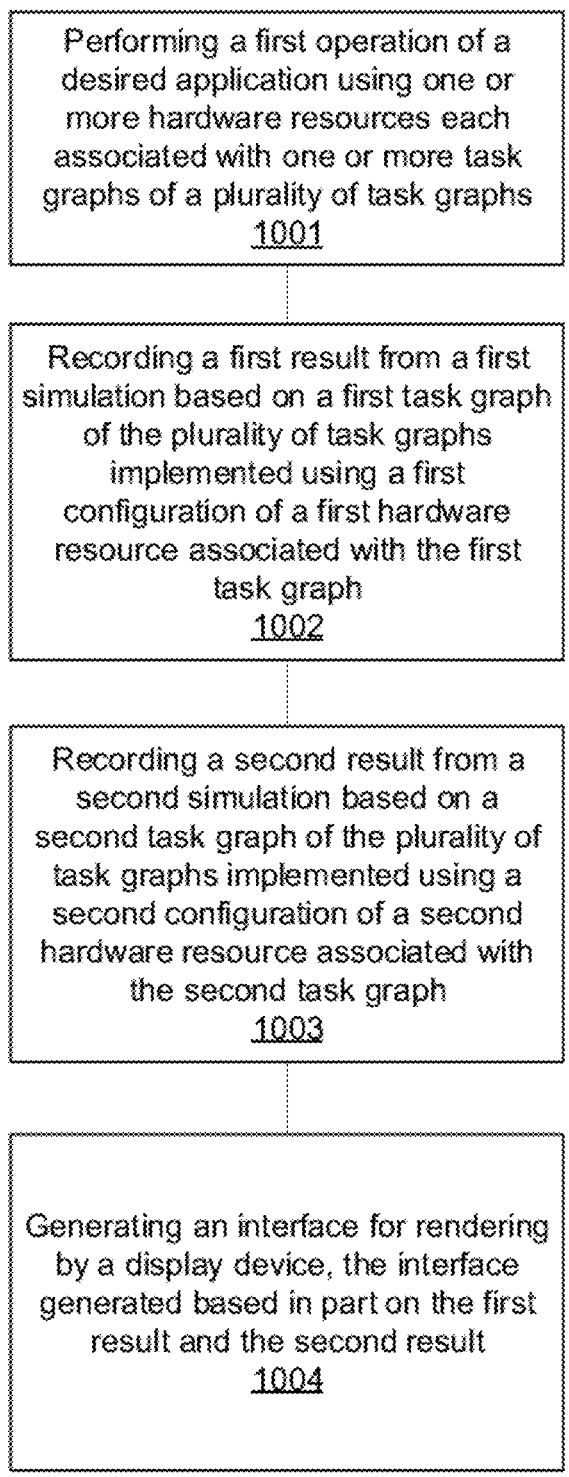
FIG. 10A depicts a flowchart of various processes associated with an example mapping of application software tasks to a plurality of mapped hardware resources, for use with embodiments of the present disclosure.

FIG. 10A depicts a flowchart of various processes associated with an example mapping of application software tasks to a plurality of mapped hardware resources, for use with embodiments of the present disclosure. In FIG. 10A, a first operation of a desired application is performed 1001 using one or more hardware resources each associated with one or more task graphs of multiple task graphs. A first result from a first simulation is recorded 1002, where the first simulation is based on a first task graph of the multiple task graphs implemented using a first configuration of a first hardware resource associated with the first task graph. A second result from a second simulation is recorded 1003, where the second simulation is based on a second task graph of the multiple task graphs implemented using a second configuration of a second hardware resource associated with the second task graph.

In one embodiment, the first task graph includes a first input interface and a first output interface. The second task graph includes a second input interface and a second output interface. In one embodiment, the first input interface matches the second input interface and the first output interface matches the second input interface. In one embodiment, the first task graph and the second task graph represent a common programmatic functionality.

Figure 10B:
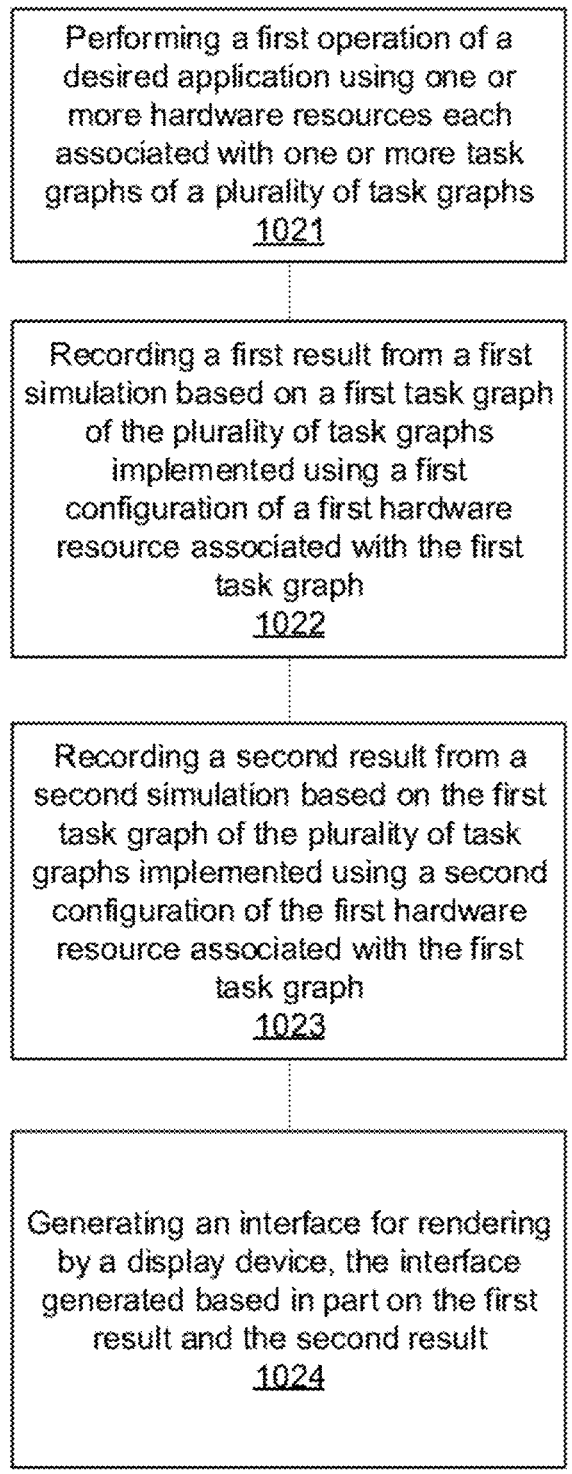
FIG. 10B depicts a flowchart of various processes associated with an example mapping of application software tasks to a plurality of mapped hardware resources, for use with embodiments of the present disclosure.

FIG. 10B depicts a flowchart of various processed associated with an example mapping of application software tasks to a plurality of mapped hardware resources, for use with embodiments of the present disclosure. In FIG. 10B, a first operation of a desired application is performed 1021 using one or more hardware resources each associated with one or more task graphs of multiple task graphs. A first result from a first simulation is recorded 1022, where the first simulation is based on a first task graph of the multiple task graphs implemented using a first configuration of a first hardware resource associated with the first task graph. A second result from a second simulation is recorded 1023, where the second simulation is based on the first task graph of the multiple task graphs implemented using a second configuration of the first hardware resource associated with the first task graph.

Figure 10C:
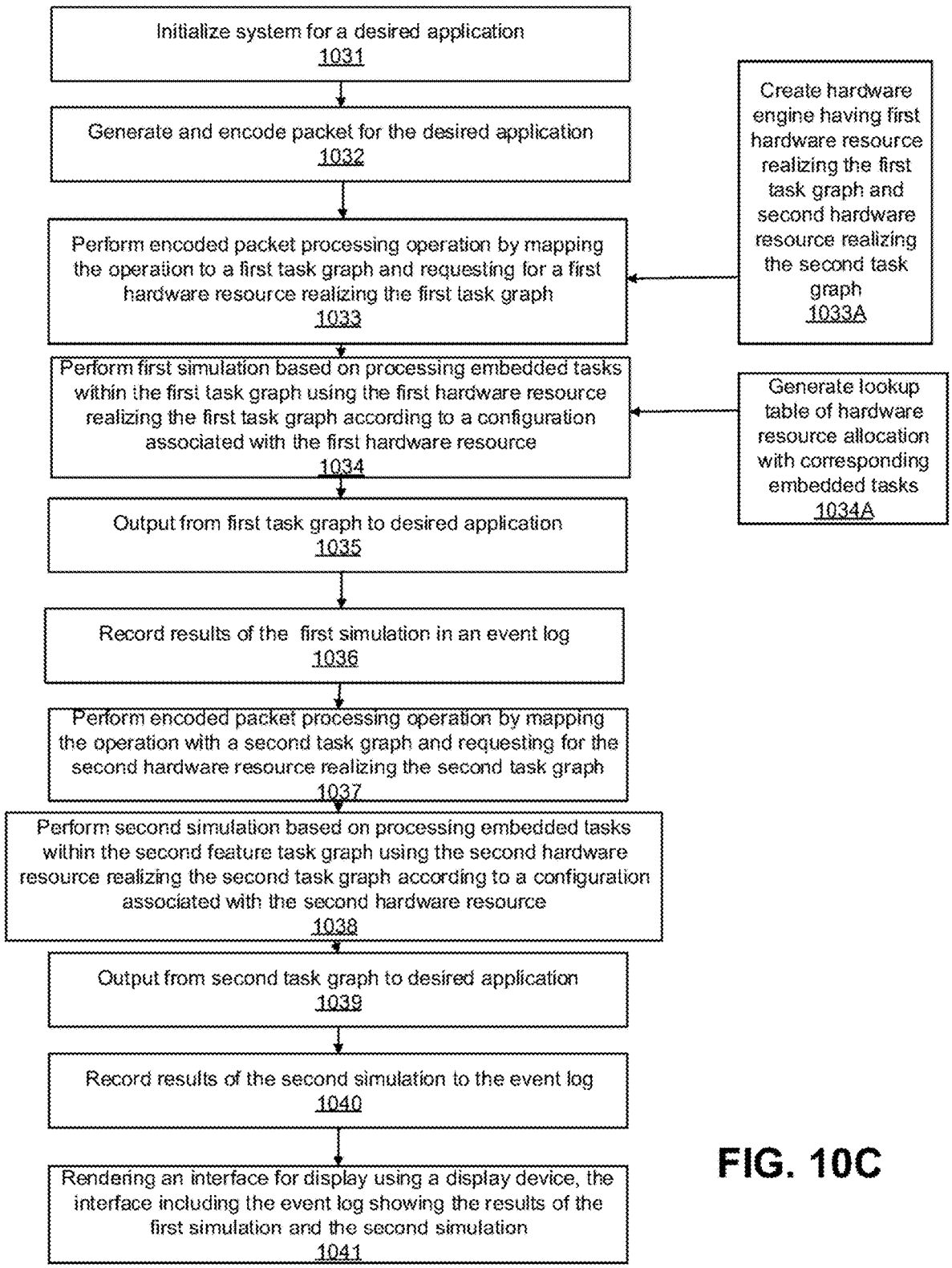
FIG. 10C depicts a flowchart of various processes associated with an example mapping of application software tasks to a plurality of mapped hardware resources, for use with embodiments of the present disclosure.

FIG. 10C depicts a flowchart of various processes associated with an example mapping of application software tasks to a plurality of mapped hardware resources, for use with embodiments of the present disclosure. In FIG. 10C, a system is initialized 1031 for a desired application. Packets for the desired application are generated and encoded 1032.

An encoded packet processing operation is performed 1033 by mapping the encoded packet processing operation to a first task graph and requesting for a first hardware resource realizing the first task graph. A hardware engine having a first hardware resource realizing the first task graph and a second hardware resource realizing the second task graph is created 1033A. A lookup table of hardware resource allocation with corresponding embedded tasks (e.g., of a task graph) is generated 1034A.

A first simulation is performed 1034 based on processing embedded tasks within the first task graph using the first hardware resource realizing the first task graph according to a configuration associated with the first hardware resource. An output from the first task graph is provided 1035 to the desired application. Results of the first simulation are recorded 1036 in an event log.

An encoded packet processing operation is performed 1037 by mapping the encoded packet processing operation to a second task graph and requesting for a second hardware resource realizing the second task graph. A second simulation is performed 1038 based on processing embedded tasks within the second task graph using the second hardware resource realizing the second task graph according to a configuration associated with the second hardware resource. An output from the second task graph is provided 1039 to the desired application. Results of the second simulation are recorded 1040 in an event log.

An interface is rendered 1041 for display using a display device. The interface includes the event log showing the results of the first simulation and the second simulation.

Figure 11:
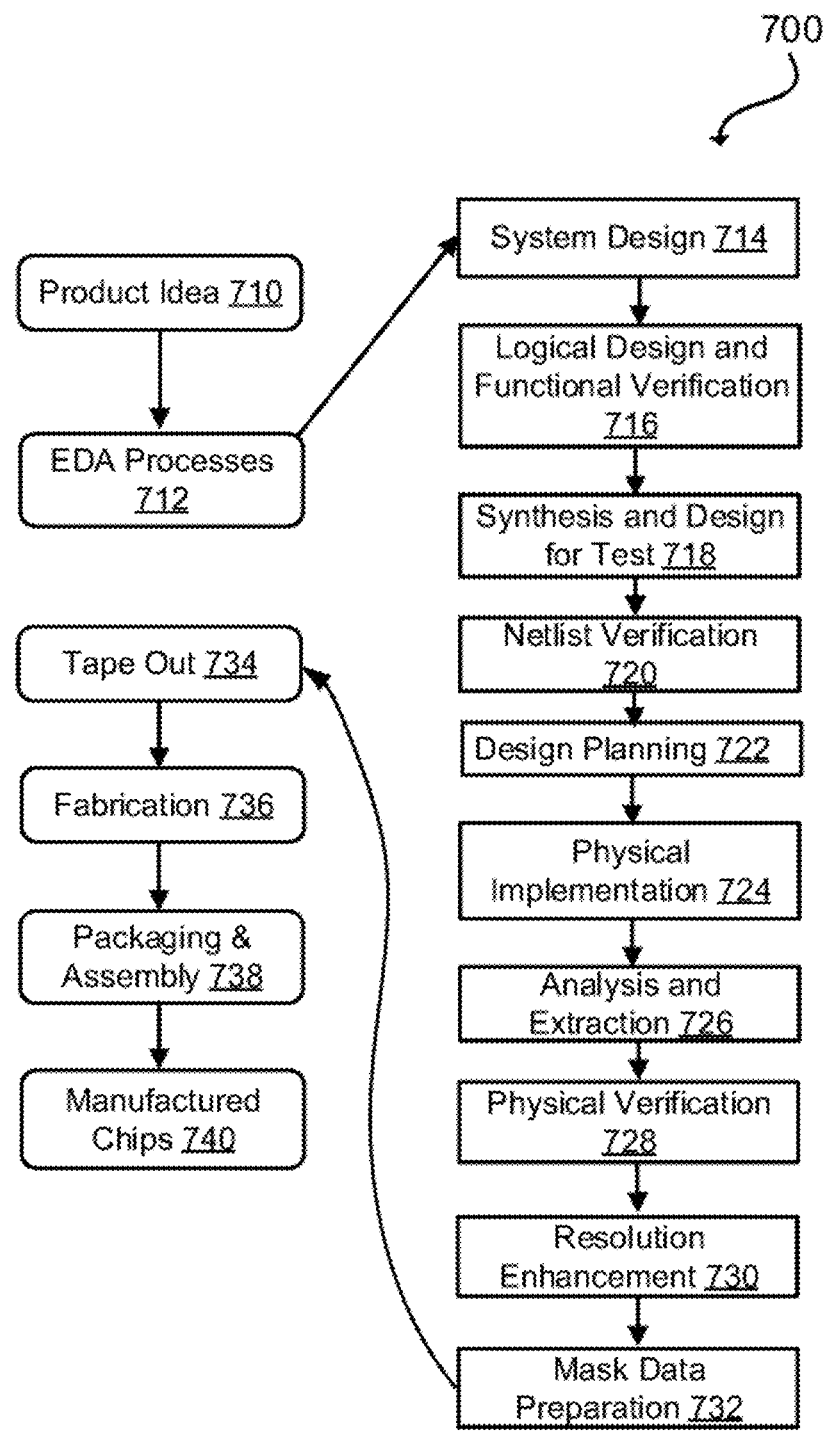
FIG. 11 depicts a flowchart of various processes used during the design and manufacture of an integrated circuit in accordance with some embodiments of the present disclosure.

FIG. 11 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 11. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 9, or host system 807 of FIG. 8) may be used to store the programs and data structures that are used by some or all of the EDA products described herein, and products used for development of cells for the library and for physical and logical design that use the library.

Figure 12:
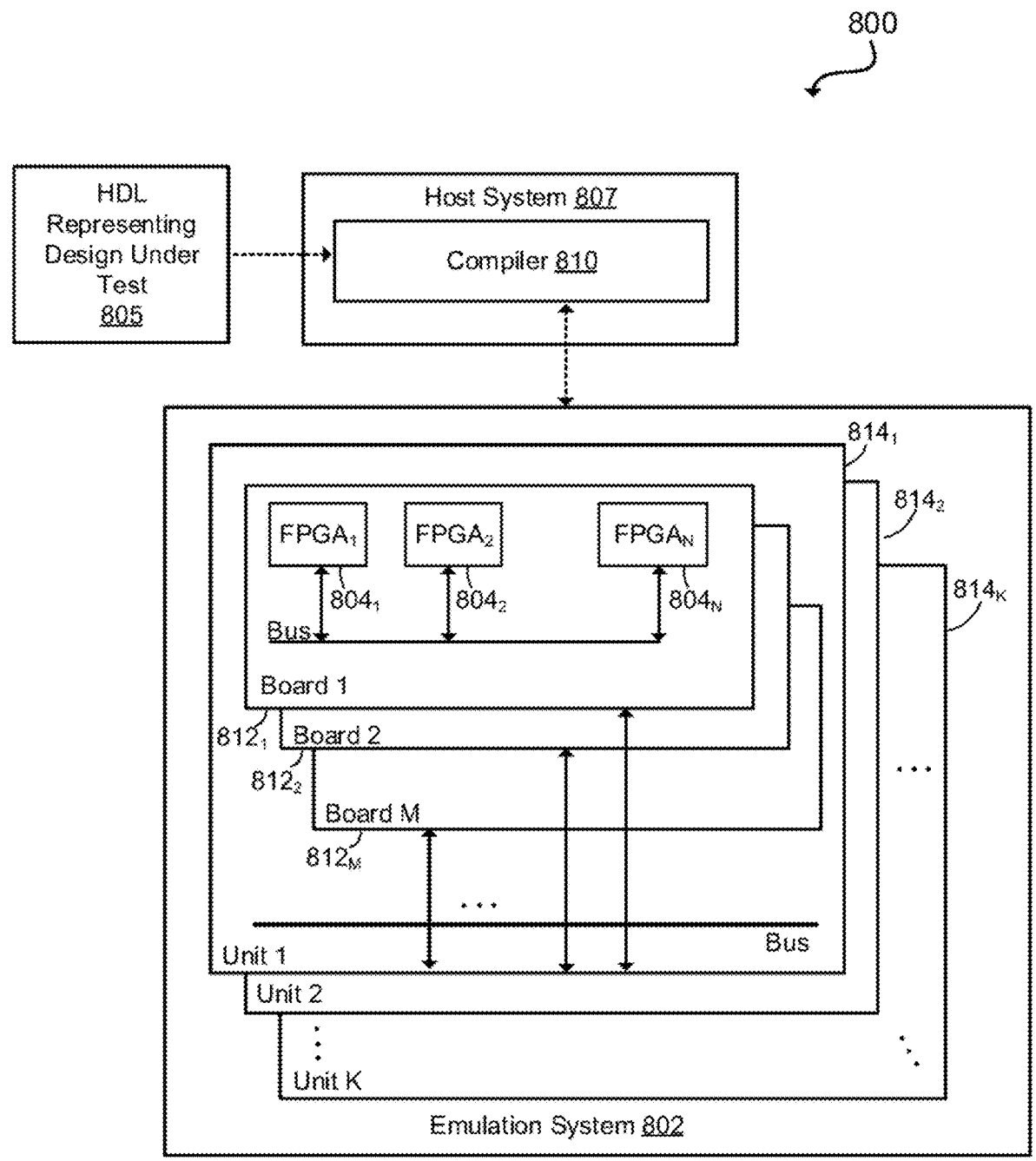
FIG. 12 depicts an abstract diagram of an example emulation system in accordance with some embodiments of the present disclosure.

FIG. 12 depicts an abstract diagram of an example emulation environment 800. An emulation environment 800 may be configured to verify the functionality of the circuit design. The emulation environment 800 may include a host system 807 (e.g., a computer that is part of an EDA system) and an emulation system 802 (e.g., a set of programmable devices such as Field Programmable Gate Arrays (FPGAs) or processors). The host system generates data and information by using a compiler 810 to structure the emulation system to emulate a circuit design. A circuit design to be emulated is also referred to as a Design Under Test ('DUT') where data and information from the emulation are used to verify the functionality of the DUT.

The host system 807 may include one or more processors. In the embodiment where the host system includes multiple processors, the functions described herein as being performed by the host system can be distributed among the multiple processors. The host system 807 may include a compiler 810 to transform specifications written in a description language that represents a DUT and to produce data (e.g., binary data) and information that is used to structure the emulation system 802 to emulate the DUT. The compiler 810 can transform, change, restructure, add new functions to, and/or control the timing of the DUT.

The host system 807 and emulation system 802 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 807 and emulation system 802 can exchange data and information through a third device such as a network server.

The emulation system 802 includes multiple FPGAs (or other modules) such as FPGAs $804_1$ and $804_2$ as well as additional FPGAs to $804_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 802 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $804_1$-$804_N$ may be placed onto one or more boards $812_1$ and $812_2$ as well as additional boards through $812_M$. Multiple boards can be placed into an emulation unit $814_1$.

The boards within an emulation unit can be connected using the backplane of the emulation unit or any other types of connections. In addition, multiple emulation units (e.g., 814₁ and 814₂ through 814_K) can be connected to each other by cables or any other means to form a multi-emulation unit system.

For a DUT that is to be emulated, the host system 300 transmits one or more bit files to the emulation system 802. The bit files may specify a description of the DUT and may further specify partitions of the DUT created by the host system 807 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 807 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 807 and/or the compiler 810 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 805 into gate level logic. For a DUT that is to be emulated, the design synthesizer sub-system receives a description of the DUT. If the description of the DUT is fully or partially in HDL (e.g., RTL or other level of abstraction), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 13:
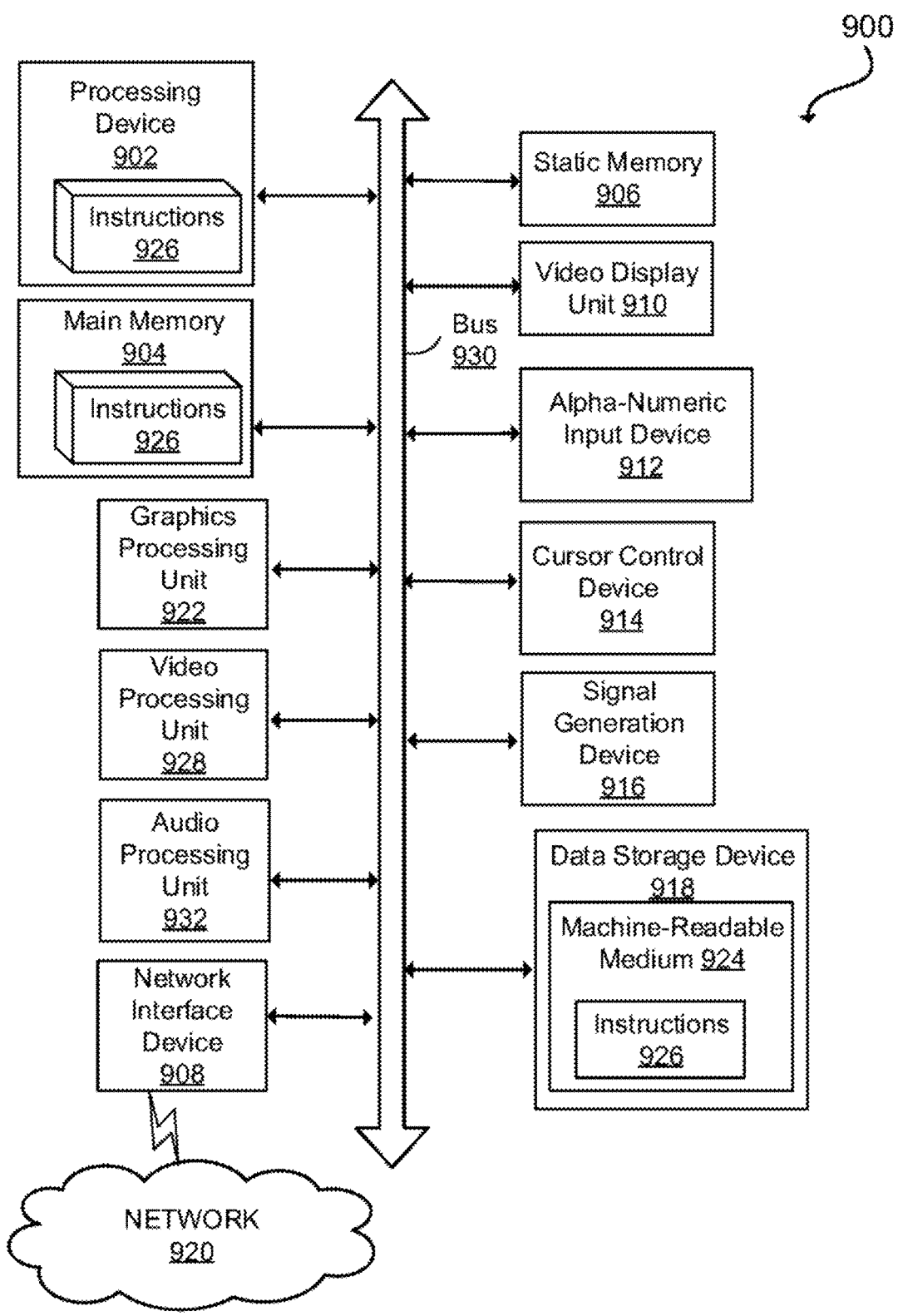
FIG. 13 depicts an abstract diagram of an example computer system in which embodiments of the present disclosure may operate.

FIG. 13 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, 1, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A computer-implemented method comprising:
generating, by a processor, a first task graph corresponding to an application software and defining a functionality so as to generate a first result, wherein the first task graph comprises a first plurality of tasks each configured to be implemented by a first configuration of a first hardware resource, wherein the first configuration includes firmware held in a non-volatile memory device;
generating, by the processor, a second task graph corresponding to the application software and defining the functionality so as to generate a second result, wherein the second task graph comprises a second plurality of tasks each configured to be implemented by a second configuration of a second hardware resource, wherein the second configuration includes a hardware acceleration resource; and
changing a code associated with the application software based on a comparison of the first result associated with the first configuration of the first hardware resource and the second result associated with the second configuration of the second hardware resource.

2. The method of claim 1, wherein the first task graph comprises a first input interface and a first output interface and the second task graph comprises a second input interface and a second output interface.

3. The method of claim 2, wherein the first input interface matches the second input interface and the first output interface matches the second output interface.

4. The method of claim 1, further comprising:
encapsulating one or more of the first the hardware resource and the second hardware resource into a hardware engine;
generating a hardware engine input interface and a hardware engine output interface for the hardware engine; and
mapping one or more operations associated with the application software to the hardware engine.

5. The method of claim 1, further comprising changing a configuration of one or more of the first hardware resource and the second hardware resource based on the comparison of the first and second results.

6. The method of claim 5, wherein one or more of the first and second configurations comprises one or more configurable attributes.

7. The method of claim 6, wherein the one or more configurable attributes comprise one of core type, firmware designation, general purpose, special purpose, packet size, packet descriptor size, processing speed, operations-per-cycle, pipeline-depth, branch predictor, stochastic cache, or tightly coupled memory (TCM).

8. The method of claim 5, wherein at least one of the first hardware resource or the second hardware resource comprises a processing element and a memory.

9. The method of claim 8, wherein at least one of the first hardware resource or the second hardware resource further comprises one or more hardware resource interfaces.

10. The method of claim 1, wherein the interface comprises digital representations of one or more of utilization data, resource utilization data, performance data, cost data, area data, timing data, resource analysis trace data, execution sequence trace data, resource instance trace data.

11. The method of claim 4, further comprising:
receiving a result from one or more of the first plurality of tasks of the first task graph, or the second plurality of tasks of the second task graph, or the operation associated with the application software via interaction signals.

12. The method of claim 1, further comprising:
receiving a configuration associated with at least one of the first hardware resource or the second hardware resource via interaction signals from a computing device prior to the generation of the first result and the second result.

13. The method of claim 1, wherein the first result and the second result are performed concurrently.

14. The method of claim 1, wherein the comparison of the first result and the second result provides information indicative of one or more of dependency and resource allocation.

15. The method of claim 1 further comprising:
enabling exploration of trade-offs between the implementation of the functionalities associated with the first task graph and the second task graph.

16. The method of claim 1, wherein the first task graph and the second task graphs are subsets of a set of task graphs available for selection to provide optimal performance of the application software.

17. A system comprising a memory storing instructions and a processor, coupled with the memory and to execute the instructions, the instructions when executed causing the processor to:
generate a first task graph corresponding to an application software and defining a functionality so as to generate a first result, wherein the first task graph comprises a first plurality of tasks each configured to be implemented by a first configuration of a first hardware resource, wherein the first configuration includes firmware held in a non-volatile memory;
generate a second task graph corresponding to the application software and defining the functionality so as to generate a second result, wherein the second task graph comprises a second plurality of tasks each configured to be implemented by a second configuration of a second hardware resource, wherein the second configuration includes a hardware acceleration resource; and
change a code associated with the application software based on a comparison of the first result associated with the first configuration of the first hardware resource and the second result associated with the second configuration of the second hardware.

18. A non-transitory computer readable medium comprising stored instructions, which when executed by a processor, cause the processor to:
generate a first task graph corresponding to an application software and defining a functionality so as to generate a first result, wherein the first task graph comprises a first plurality of tasks each configured to be implemented by a first configuration of a first hardware resource, wherein the first configuration includes firmware held in a non-volatile memory device; generate a second task graph corresponding to the application software and defining the functionality so as to generate a second result, wherein the second task graph comprises a second plurality of tasks each configured to be implemented by a second configuration of a second hardware resource, wherein the second configuration includes a hardware acceleration resource; and
change a code associated with the application software based on a comparison of the first result associated with the first configuration of the first hardware resource and the second result associated with the second configuration of the second hardware resource.

19. The non-transitory computer readable medium of claim 18 wherein the instructions further cause the processor to generate an input interface and an output interface for the first task graph.

* * * * *